United States Patent [19]
Nagasawa

[11] Patent Number: 5,886,813
[45] Date of Patent: Mar. 23, 1999

[54] AUTOFOCUS CONTROL APPARATUS AND METHOD APPLIED TO MICROSCOPE

[75] Inventor: Nobuyuki Nagasawa, Hachioji, Japan

[73] Assignee: Olympus Optical Co., Ltd., Tokyo, Japan

[21] Appl. No.: 933,261

[22] Filed: Sep. 18, 1997

[30] Foreign Application Priority Data

Sep. 20, 1996 [JP] Japan .................................. 8-250593

[51] Int. Cl.⁶ .............................. G02B 7/05; G02B 21/26
[52] U.S. Cl. ...................... 359/383; 359/368; 250/201.3
[58] Field of Search .................................. 359/368–369, 359/379–384, 821, 410, 425, 393; 250/201.2–201.4, 204, 306, 307; 396/101, 103

[56] References Cited

U.S. PATENT DOCUMENTS

| | | | |
|---|---|---|---|
| 4,695,137 | 9/1987 | Jorgens et al. | 359/383 |
| 5,235,375 | 8/1993 | Yamana et al. | 396/101 |
| 5,260,825 | 11/1993 | Nagano et al. | 359/383 |
| 5,276,550 | 1/1994 | Kojima | 359/383 |
| 5,557,456 | 9/1996 | Garner et al. | 359/383 |
| 5,604,344 | 2/1997 | Finarov | 250/201.3 |
| 5,675,141 | 10/1997 | Kukihara | 250/201.3 |

FOREIGN PATENT DOCUMENTS

| | | |
|---|---|---|
| 57-5016 | 1/1982 | Japan . |
| 2-109008 | 4/1990 | Japan . |

*Primary Examiner*—Thong Nguyen
*Attorney, Agent, or Firm*—Frishauf, Holtz, Goodman, Langer & Chick

[57] ABSTRACT

The preceding-profile of a specimen image upon inserting a preceding objective lens in the optical path to a specimen placed on a stage is detected. The succeeding-profile of the specimen image upon inserting a succeeding objective lens in the optical path is predicted on the basis of the preceding- and succeeding-optical parameters of the preceding and succeeding objective lenses inserted in the optical path, and the preceding-profile. The position of the stage with respect to the specimen is adjusted on the basis of the succeeding-profile obtained by this prediction.

10 Claims, 5 Drawing Sheets

5,886,813

AUTOFOCUS CONTROL APPARATUS AND METHOD APPLIED TO MICROSCOPE

BACKGROUND OF THE INVENTION

The present invention relates to an autofocus control apparatus and method applied to an optical device such as a microscope.

Conventionally, various types of autofocus detection of autofocus detection apparatuses applied to optical devices such as a microscope have been available.

The first example is the following method disclosed in Jpn. Pat. Appln. KOKAI Publication No. 2-109008. In autofocus control for controlling a photographing optical system to focus on an object image formed on the image pickup screen via an imaging optical system, the focus area corresponding to the object image is divided into a plurality of detection areas. Focus control for the imaging optical system is performed using the focusing information of these areas except for ambiguous focusing information.

The second example is the following method disclosed in Jpn. Pat. Appln. KOKAI Publication No. 57-5016. An image formed by an imaging optical system is scanned using a scan means to obtain a scan signal representing the illuminance distribution of the image. This scan signal is supplied to an illuminance change detector to obtain a signal representing an illuminance change at each small portion in the image. Based on this illuminance change signal, an image visibility signal on the scan surface is obtained. In this case, a differentiating circuit having adjustable operation characteristics is used as the illuminance change detector, and an adjustment circuit for adjusting the operation characteristics of this differentiating circuit is arranged. This adjustment circuit adjusts the operation characteristics and gain of the differential circuit on the basis of the numerical aperture information of the imaging optical system.

According to a method of selecting an area suitable for focus detection from an image passing through the imaging optical system, like the method of the first example, e.g., when a high-magnification objective lens is switched to a low-magnification objective lens in a microscope to observe a specimen, the specimen observation range is narrow in observation by the high-magnification objective lens. For this reason, if the high-magnification objective lens is used, the specimen image may fall outside the field of view or the range of a focus detection sensor depending on the observation position of the specimen, disabling focus detection. When the offset amount from the focal point is large, the specimen image is hard to observe, so an area suitable for focus detection cannot be selected from this image. For this reason, this method is effective only after the lens comes near the focal position.

According to a method of changing the visibility evaluation function of an image depending on the conditions of an imaging optical system to always perform appropriate image evaluation, like the second example, e.g., when this method is applied to a microscope, the frequency distribution of the specimen image to be observed varies depending on each specimen even after the specimen image passes through the same imaging optical system. For this reason, even if the visibility evaluation function of the image is changed, it is not always appropriate depending on the conditions of the imaging optical system.

It is an object of the present invention to provide an autofocus control apparatus and method in which high-speed autofocus detection can be attained with high precision, and stable focus detection can be realized.

It is another object of the present invention to provide a microscope in which high-speed autofocus detection can be attained with high precision, and stable focus detection can be realized.

BRIEF SUMMARY OF THE INVENTION

The above objects are achieved by the following autofocus control apparatus. That is, there is provided an autofocus control apparatus comprising a stage on which a specimen is placed, a plurality of objective lenses which are selectively inserted in an optical path to the specimen mounted on the stage, and have different optical parameters, an imaging optical system for forming an image of the specimen through, of the plurality of objective lenses, an objective lens selectively inserted in the optical path, an image sensor on which the optical image formed by the imaging optical system is projected to output an image signal of the specimen, calculation means for calculating a profile of the specimen image on the basis of the image signal of the specimen output from the image sensor, prediction means for predicting a succeeding-profile of the specimen image upon inserting a succeeding objective lens in the optical path on the basis of a preceding-optical parameter of a preceding objective lens and a succeeding-optical parameter of the succeeding objective lens, which are inserted in the optical path, and a preceding-profile of the specimen image upon inserting the preceding objective lens in the optical path, which is obtained from the calculation means, and control means for adjusting a position of the stage on the basis of the succeeding-profile obtained from the prediction means to perform focusing control.

The above objects are achieved by the following autofocus control method. That is, there is provided an autofocus control method comprising the steps of detecting a preceding-profile of a specimen image upon inserting a preceding objective lens in an optical path to a specimen placed on a stage, predicting a succeeding-profile of the specimen image upon inserting a succeeding objective lens in the optical path on the basis of a preceding-optical parameter of the preceding objective lens and a succeeding-optical parameter of the succeeding objective lens, which are inserted in the optical path, and the preceding-profile, and adjusting a position of the stage with respect to the specimen on the basis of the succeeding-profile obtained in the prediction step.

The above objects are achieved by the following microscope. That is, there is provided a microscope comprising a frame, a stage which is attached to the frame and on which a specimen is placed, a revolver which is attached to the frame, and has a plurality of objective lenses with different optical parameters to be selectively inserted in an optical path to the specimen placed on the stage, an imaging optical system attached to the frame to form an image of the specimen through, of the plurality of objective lenses of the revolver, an objective lens selectively inserted in the optical path, an image sensor which is attached to the frame, and on which the optical image formed by the imaging optical system is projected to output an image signal of the specimen, calculation means for calculating a frequency distribution of the image signal of the specimen output from the image sensor, prediction means for predicting a frequency distribution of the specimen image upon inserting a succeeding objective lens in the optical path on the basis of a change in optical parameters of a preceding objective lens and the succeeding objective lens inserted in the optical path, and the frequency distribution of the specimen image upon inserting the preceding objective lens in the optical path, that is obtained from the calculation means, and control means for adjusting a position of the stage on the basis of the frequency distribution obtained from the prediction means to perform focusing control.

According to the present invention, the focus detection speed upon exchanging the objective lens can be increased. Even when dust or the like attaches to the specimen, or stray light enters to produce contrast not attributed to the specimen, if the features are different from those of the specimen, they can be eliminated in evaluating the image. Therefore, high-precision focus detection can also be performed.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described below with reference to the several views of the accompanying drawing.

First Embodiment

Figure 1:
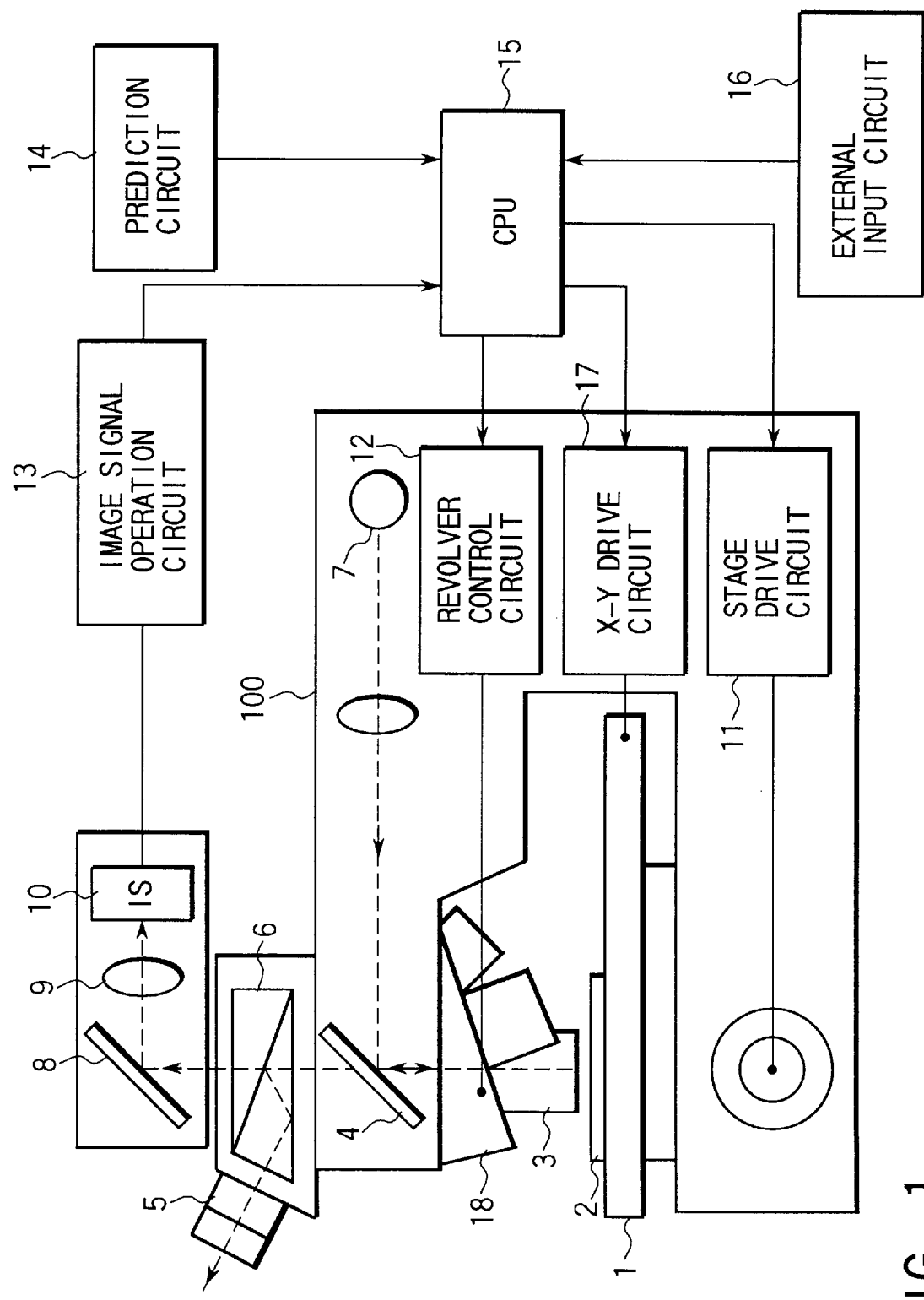
FIG. 1 is a block diagram showing a schematic arrangement when an autofocus control apparatus of the present invention is applied to a reflection microscope.

FIG. 1 shows a schematic arrangement when an autofocus control apparatus of the present invention is applied to a reflection microscope. In FIG. 1, a stage 1 is arranged on a microscope frame 100. A specimen 2 is placed on the stage 1. A reflection illumination light source 7 is arranged on the microscope frame 100 above the stage 1. In this case, incident illumination light from the reflection illumination light source 7 is reflected by a half-mirror 4 toward the specimen 2 on the stage 1 to illuminate it via an objective lens 3 of a revolver 18. An optical image of the specimen 2 illuminated with the light is incident on a split prism 6 through the objective lens 3 and the half-mirror 4, and split by the split prism 6 to two optical paths. One of the split images is observed by the observer through an eyepiece lens 5, while the other is projected on an image sensor 10 through a mirror 8 and an imaging lens 9.

The image sensor 10 converts the image of the specimen 2 into an electrical signal, and inputs the electrical signal to an image signal calculation circuit 13. The image signal calculation circuit 13 calculates the profiles of the image such as the frequency distribution and visibility level of the image of the specimen 2 from the electrical signal received from the image sensor 10 in accordance with a command from a CPU 15. The image signal calculation circuit 13 transmits the results to the CPU 15.

A stage drive circuit 11, a revolver control circuit 12, a prediction circuit 14, an external input circuit 16, and an X–Y drive circuit 17 are connected to the CPU 15.

In this case, the stage drive circuit 11 vertically moves the stage 1 along the optical axis of the objective lens 3. The stage drive circuit 11 drives the stage 1 so as to maximize the visibility level in accordance with a control command from the CPU 15 based on the visibility level of the image of the specimen 2 received from the image signal calculation circuit 13, thereby performing focus detection.

The revolver control circuit 12 rotates the revolver 18 supporting a plurality of objective lenses 3 having different optical parameters including the magnification and the numerical aperture. The revolver control circuit 12 detects the position of the revolver 18, and transmits it to the CPU 15. In addition, the revolver control circuit 12 rotates the revolver 18 upon reception of a control command from the CPU 15 to exchange the objective lens 3 in the optical path with another one having a different magnification.

The X–Y drive circuit 17 drives the stage 1 in a direction perpendicular to the optical axis of the objective lens 3, i.e., in the X and Y directions. The X–Y drive circuit 17 can change the observation area with respect to the specimen 2 on the stage 1 upon reception of a control command from the CPU 15.

The external input circuit 16 has manipulation means such as a plurality of switches. Each manipulation means corresponds to a predetermined operation such as rotation of the revolver 18, vertical movement of the stage 1, X–Y driving, or focus detection. When the observer manipulates a switch corresponding to a desired operation, the external input circuit 16 transmits the manipulation contents at this time to the CPU 15. The external input circuit 16 is connected to a host computer via a communication line (not shown). When the external input circuit 16 receives a command from the host computer via the communication line, it transmits the command information to the CPU 15.

When the objective lens 3 in the optical path is exchanged with another one by the revolver 18, the prediction circuit 14 receives, from the CPU 15, information about the optical characteristics of the preceding and succeeding objective lenses 3, and the preceding image frequency distribution of the specimen 2. The prediction circuit 14 predicts the frequency distribution as the image state of the specimen 2 after exchanging the objective lens 3 on the basis of the received information.

The CPU 15 supplies control commands to the stage drive circuit 11, the revolver control circuit 12, and the X–Y drive circuit 17 on the basis of information received from the external input circuit 16 to perform rotation of the revolver 18, vertical movement of the stage 1, X–Y driving, and focus detection. The CPU 15 designates, to the image calculation circuit 13, a frequency band of interest used in calculating the visibility level on the basis of the prediction results of the frequency distribution of the specimen image received from the prediction circuit 14. Upon exchanging the objective lens 3, the CPU 15 repeatedly receives the visibility level from the image calculation circuit 13, and moves the stage 1 to a position where the visibility level is maximized.

The operation of the first embodiment having this arrangement will be described below.

When specimen observation is instructed by the operation of the external input circuit 16, the reflection illumination light source 7 is turned on. Illumination light emitted from the reflection illumination light source 7 is reflected by the half-mirror 4 to illuminate the specimen 2 on the stage 1 via the objective lens 3. An optical image of the specimen 2 illuminated with the light is sent to the split prism 6 through the objective lens 3 and the half-mirror 4, and split to two optical paths. One image is observed by the observer through the eyepiece lens 5, whereas the other is projected on the image sensor 10 through the mirror 8 and the imaging lens 9.

The image of the specimen 2 projected on the image sensor 10 is converted into an electrical signal, which is sent to the image signal calculation circuit 13. Upon reception of a command from the CPU 15, the image signal calculation circuit 13 calculates profiles such as the frequency distribution and visibility level of the image from the signal received from the image sensor 10, and sends the results to the CPU 15.

The CPU 15 sends a command to the stage drive circuit 11 on the basis of the visibility level of the specimen image received from the image signal calculation circuit 13 to vertically move the stage 1 along the optical axis of the objective lens 3. After moving the stage 1, the image signal calculation circuit 13 also calculates the visibility level of the image of the specimen 2 again. While vertically moving the stage 1 so as to maximize the visibility level, focus detection is performed.

In this state, when the objective lens 3 in the optical path is to be exchanged with another one having a different magnification, the CPU 15 sends a control command to drive the revolver control circuit 12, thereby rotating the revolver 18 and inserting an objective lens 3 with a desired magnification in the optical path.

In this case, information about the optical characteristics of the preceding and succeeding objective lenses 3, and the preceding frequency distribution of the specimen image are transmitted from the CPU 15 to the prediction circuit 14.

Figure 2:
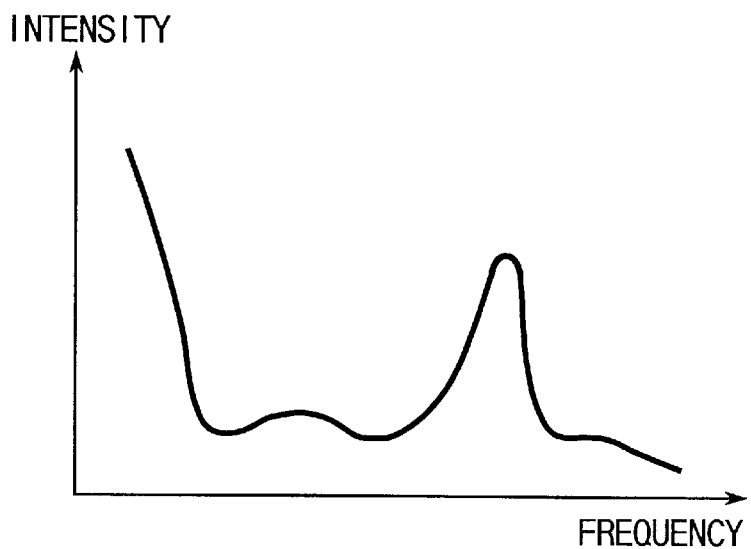
FIGS. 2, 4, and 5 are graphs plotting the frequency against the light intensity for explaining the first embodiment.
Figure 3:
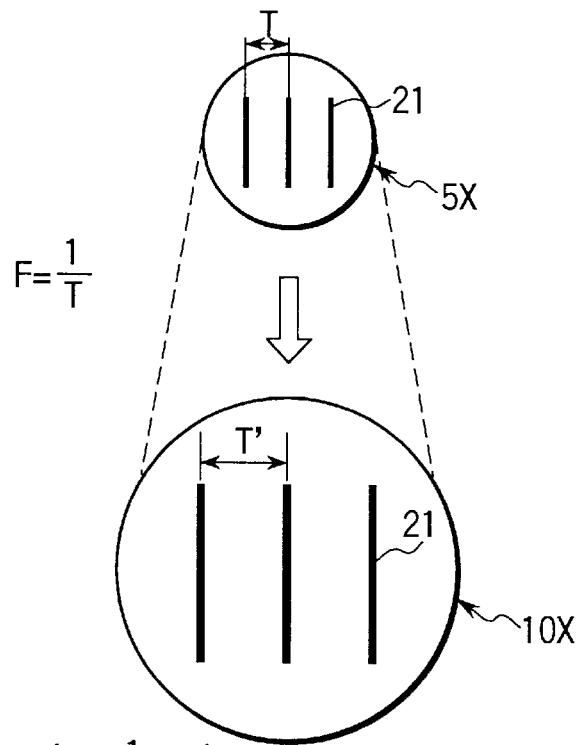
FIG. 3 is a view showing the principle of performing focus control in a succeeding objective lens on the basis of the frequency distribution.

The prediction circuit 14 predicts the succeeding frequency distribution of the specimen image upon exchanging the objective lens 3 on the basis of the information received from the CPU 15, and transmits the prediction results to the CPU 15. Assume that the objective lens 3 used for current observation has a magnification of 5×, and the frequency distribution of the specimen image has features as shown in FIG. 2. As shown in FIG. 3, letting F be the frequency, if a plurality of bars 21 aligned at a period T are observed, they have a frequency F of 1/T. When this objective lens 3 is exchanged with another one having a magnification of 10×, the CPU 15 transmits the optical characteristics of the objective lens 3 having a magnification of 10×, and the features of the frequency distribution of the specimen image to the prediction circuit 14. A period T' for the magnification of 10×is equal to 2T, and a frequency F' at this time is $1/T'=\frac{1}{2}T=(\frac{1}{2})\times F$.

Figure 4:
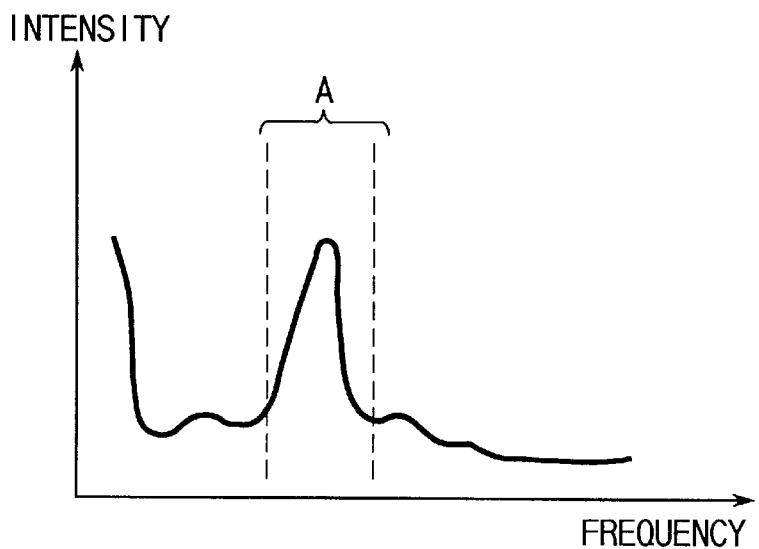

Since the magnification upon exchanging the objective lens doubles, the prediction circuit 14 predicts that the frequency distribution of the specimen image will shift to be ½ the frequency distribution of the specimen image before exchanging the objective lens in terms of frequency, as shown in FIG. 4, and transmits the prediction results to the CPU 15. On the basis of the prediction results, the CPU 15 designates, to the image signal calculation circuit 13, a range (portion A in FIG. 4) having the highest intensity in the predicted frequency distribution shown in FIG. 4 as a frequency band of interest. Also in this case, the CPU 15 causes the image signal calculation circuit 13 to calculate the visibility level in the frequency band of interest within the specimen image, and performs focus detection while vertically moving the stage 1 to a position where the visibility level is maximized.

In this manner, a range of interest in the frequency distribution as the image state of the specimen 2 upon exchanging the objective lens 3 is predicted from the optical characteristics of the preceding and succeeding objective lenses 3, and the features of the frequency distribution of the specimen image by the preceding objective lens. Focus detection is performed while vertically moving the stage 1 so as to maximize the visibility level in the frequency band of interest. With this operation, the focus detection speed upon exchanging the objective lens 3 can be increased. Even when, e.g., dust or the like attaches to the specimen 2, or stray light enters to produce contrast not accounted for by the specimen 2, if the features are different from those of the specimen 2, they can be eliminated to evaluate the image. Therefore, high-precision focus detection can also be performed for the specimen 2.

Assume that the objective lens 3 used for current observation has a magnification of 20×, and the frequency distribution of the specimen image has features as shown in FIG. 3. In this state, when the objective lens 3 is to be exchanged with another one having a magnification of 5×, the CPU 15 transmits the optical characteristics of the objective lens 3 having a magnification of 5×, and the features of the specimen image to the prediction circuit 14. Since the magnification after exchanging the objective lens is ¼, the prediction circuit 14 predicts that the frequency distribution of the specimen image will shift to be 4 times the frequency distribution of the specimen image before exchanging the objective lens in terms of frequency, as shown in FIG. 5, and transmits the prediction results to the CPU 15.

Figure 5:
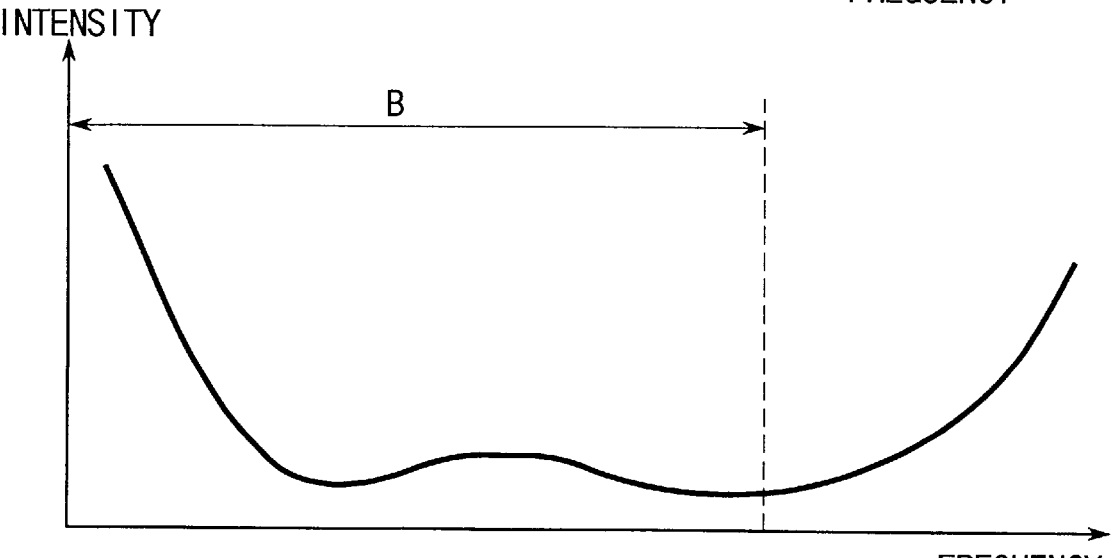

On the basis of the prediction results, the CPU 15 designates, to the image signal calculation circuit 13, a range having the highest intensity in the predicted frequency distribution shown in FIG. 5 as a frequency band of interest. At the same time, the CPU 15 determines whether the designated frequency band is a frequency band (e.g., range B in FIG. 5) detectable by the image sensor 10. If so, in the same manner as described above, the CPU 15 causes the image signal calculation circuit 13 to calculate the visibility level in the frequency band of interest within the specimen image, and performs focus detection while vertically moving the stage 1. If the CPU 15 determines that the designated frequency band is too high for the pixel size of the image sensor 10 to detect, the CPU 15 stops focus detection after exchanging the objective lens to prevent any unnecessary operation.

Second Embodiment

In the first embodiment described above, the frequency distribution of the specimen image is predicted by the prediction circuit 14. In the second embodiment, the shape of the specimen image is predicted to perform focus detection on the basis of information about the predicted image shape.

In this case, when an objective lens 3 in the optical path is to be exchanged with another one by a revolver 18, a prediction circuit 14 shown in FIG. 1 receives, from a CPU 15, information about the optical characteristics of the preceding and succeeding objective lenses 3, and the preceding shape of the specimen image, and predicts the succeeding image shape of a specimen 2 after exchanging the objective lens 3 on the basis of the received information. The remaining operation is the same as that in FIG. 1, and FIG. 1 is quoted in the second embodiment.

Also in this case, when the objective lens 3 in the optical path is to be exchanged with another one having a different magnification, the CPU 15 sends a control command to drive a revolver control circuit 12, thereby rotating the revolver 18 and inserting an objective lens 3 having a desired magnification in the optical path.

In this case, information about the optical characteristics of the preceding and succeeding objective lenses 3, and the preceding shape of the specimen image are transmitted from the CPU 15 to the prediction circuit 14.

Figure 6:
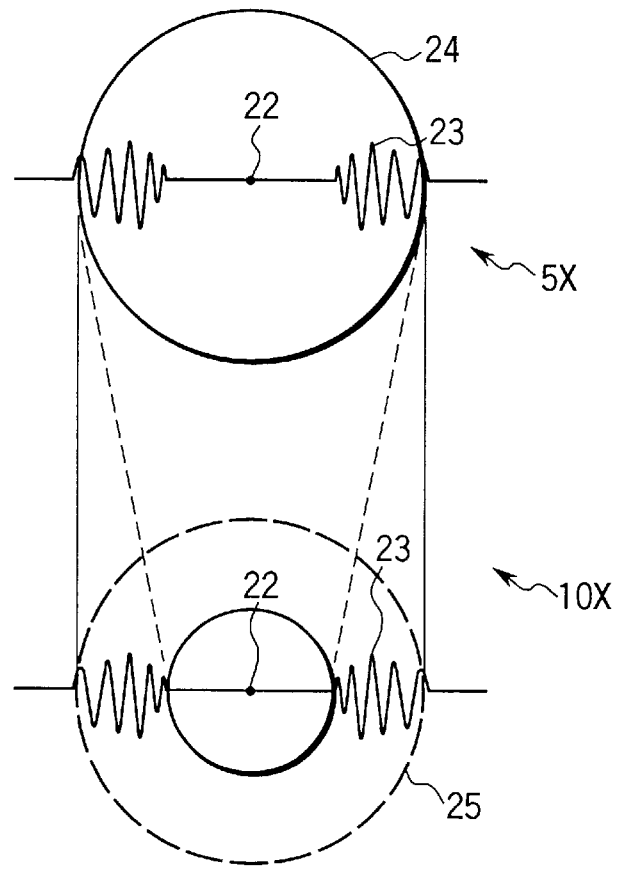
FIG. 6 is a view showing the principle of performing focus control in the succeeding objective lens on the basis of the shape of a specimen image.
Figure 7:
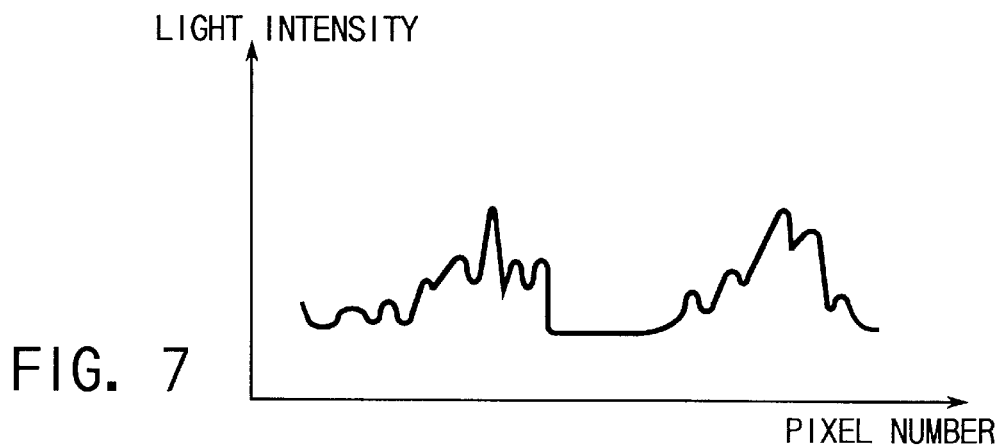
FIGS. 7 to 10 are graphs plotting the frequency against the light intensity for explaining the second embodiment of the present invention.

The prediction circuit 14 predicts the succeeding shape of the specimen image after exchanging the objective lens 3 on the basis of the information received from the CPU 15, and transmits the prediction results to the CPU 15. Assume that a point 22 is observed at a magnification of 5×, and then at a magnification of 10×, as shown in FIG. 6. A light intensity curve 23 falls within an observation area 24 in 5×observation, and within an observation area 25 in 10×observation. That is, assuming that the objective lens 3 used for current observation has a magnification of 5×, and the shape (light intensity curve) of the specimen image has features as shown in FIG. 7, when the objective lens 3 is exchanged with another one having a magnification of 10×, the CPU 15 transmits the optical characteristics of the objective lens 3 having a magnification of 10×and the shape features of the specimen image to the prediction circuit 14. Since the magnification after exchanging the objective lens doubles, the prediction circuit 14 predicts that the shape of the specimen image will change from the shape of the specimen image before exchanging the objective lens to the one shown in FIG. 8, and transmits the prediction results to the CPU 15.

Figure 8:
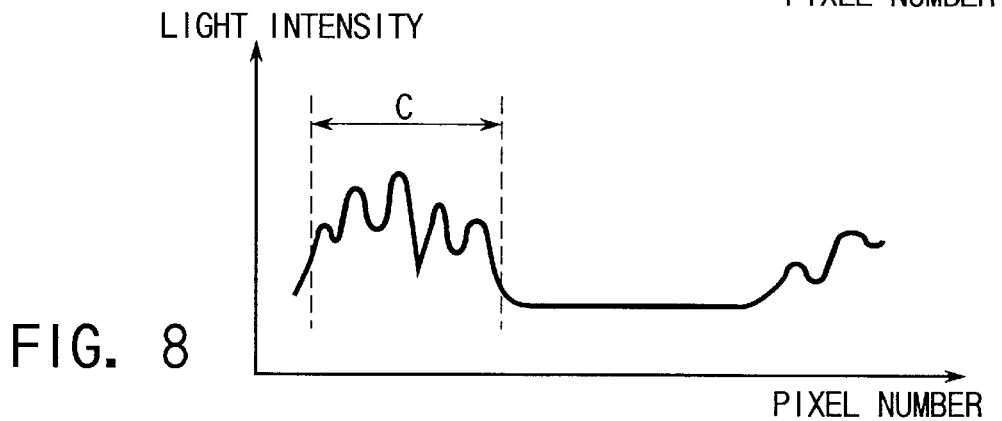

On the basis of the prediction results, the CPU 15 designates, to an image signal calculation circuit 13, an area (portion C in FIG. 8) where the contrast necessary for focus detection is the highest as a shape area of interest from the predicted image shape shown in FIG. 8. The CPU 15 causes the image signal calculation circuit 13 to calculate the visibility level in the target shape range within the specimen image, and performs focus detection while vertically moving a stage 1 to a position where the visibility level is maximized, i.e., a position where the contrast intensity in the area of interest is maximized.

Also with this operation, the shape area of interest is predicted from the optical characteristics of the objective lens 3 which are given in advance, and the features of the image shape of the specimen. Focus detection is performed while vertically moving the stage 1 so as to maximize the visibility level in the shape area of interest. Accordingly, the focus detection speed upon exchanging the objective lens 3 can be increased. Even when, e.g., dust or the like attaches to the specimen 2, or stray light enters to produce contrast not caused by the specimen 2, if the features are different from those of the specimen 2, they can be eliminated to evaluate the image. Therefore, high-precision focus detection can also be performed for the specimen 2.

Figure 9:
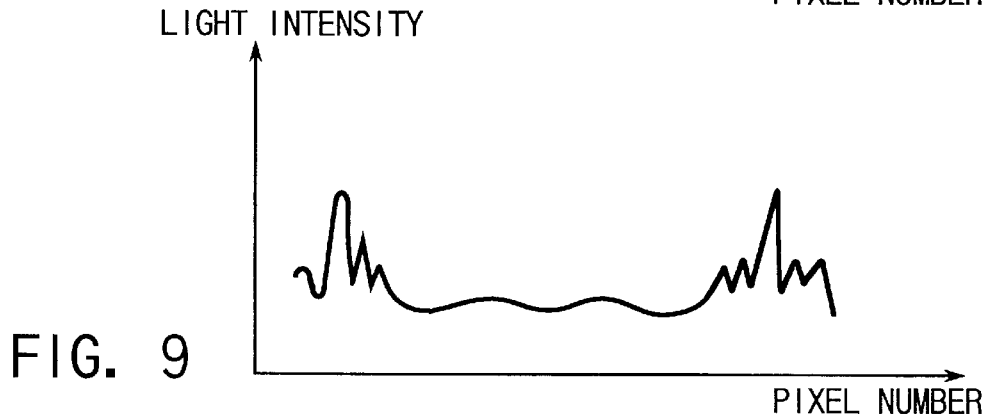

Assume that the objective lens 3 used for current observation has a magnification of 5×, and the shape of the specimen image has features as shown in FIG. 9. When the objective lens 3 is to be exchanged with another one having a magnification of 10×, the CPU 15 transmits the optical characteristics of the objective lens 3 having a magnification of 10×, and the features of the image shape of the specimen to the prediction circuit 14. Since the magnification upon exchanging the objective lens doubles, the prediction circuit 14 may predict that the image of the specimen 2 during observation will fall outside the input range of an image sensor 10 (range D in FIG. 10).

Figure 10:
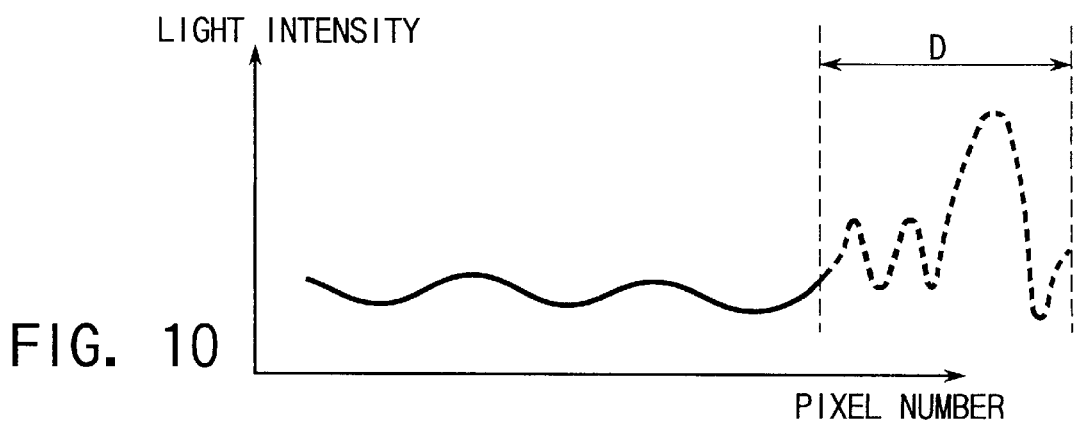

If this prediction is transmitted to the CPU 15, the CPU 15 operates the movement amount of the stage 1 in the X and Y directions in order to project the specimen image shown in the range D of FIG. 10 on the image sensor 10. From these results, an X–Y drive circuit 17 is controlled to adjust the image (range D in FIG. 10) of the specimen 2 on the stage 1 so as to be projected on the image sensor 10.

In this state, the visibility level in the range within the specimen image is calculated by the image signal calculation circuit 13. While vertically moving the stage 1 to a position where the visibility level is maximized, focus detection is performed. When an in-focus state is attained, the CPU 15 sends a command to the X–Y drive circuit 17 again to return the stage 1 to the initial position.

With this operation, the specimen 2 is not lost in exchanging the objective lens 3, and the operation stability of focus detection can be further increased. Particularly in an automatic detection apparatus in which a microscope and an X–Y scanning stage are combined, the load of confirmation by the observer's eye can be reduced.

In the above embodiments, the autofocus control apparatus of the present invention is applied to a reflection microscope. As a matter of course, the autofocus control apparatus of the present invention can also be applied to a transmission microscope.

Figure 11:
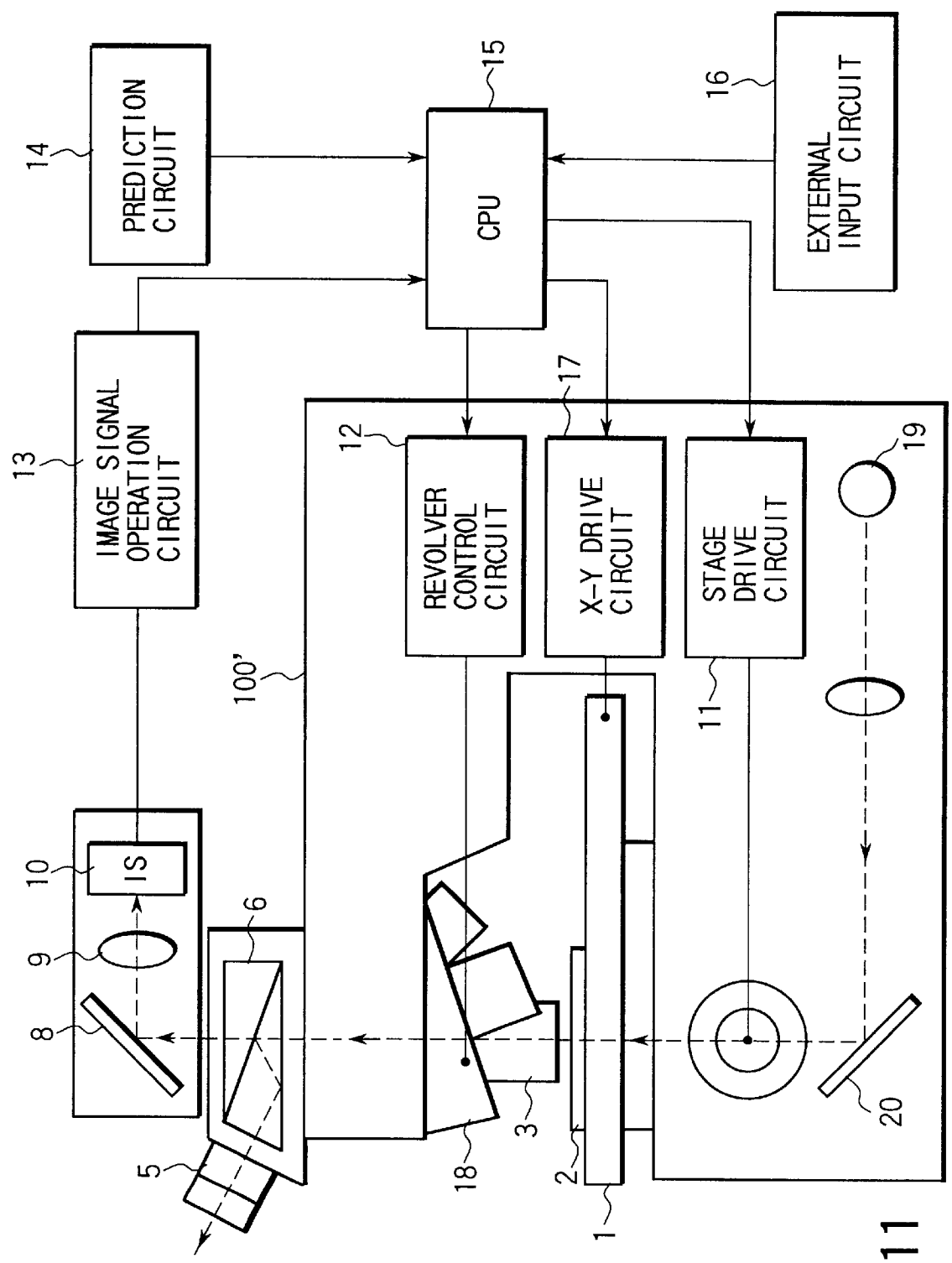
FIG. 11 is a block diagram showing a schematic arrangement when the autofocus control apparatus of the present invention is applied to a transmission microscope.

FIG. 11 shows a schematic arrangement when the autofocus control apparatus of the present invention is applied to a transmission microscope. In FIG. 11, a stage 1 is arranged on a microscope frame 100'. A transmission illumination light source 19 is arranged on the microscope frame 100' below the stage 1. In this case, transmission illumination light from the transmission illumination light source 19 is reflected by a half-mirror 20 to a specimen 2 on the stage 1 to illuminate the specimen 2 via an objective lens 3 of a revolver 18. The autofocus control apparatus and method themselves are the same as those of the reflection microscope.

As has been described above, according to the present invention, the speed of focus detection upon exchanging an objective lens can be increased. In addition, high-precision focus detection can be realized without being influenced by disturbances such as stray light and dust.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

I claim:

1. An autofocus control apparatus comprising:

a stage on which a specimen is placed;

a plurality of objective lenses which are selectively inserted in an optical path to the specimen mounted on said stage, and have different optical parameters;

an imaging optical system for forming an image of the specimen through, of said plurality of objective lenses, an objective lens selectively inserted in the optical path;

an image sensor on which the optical image formed by said imaging optical system is projected to output an image signal of the specimen;

calculation means for calculating a profile of the specimen image on the basis of the image signal of the specimen output from said image sensor;

prediction means for predicting a succeeding-profile of the specimen image upon inserting a succeeding objective lens in the optical path on the basis of a preceding-optical parameter of a preceding objective lens and a succeeding-optical parameter of said succeeding objective lens, which are inserted in the optical path, and a preceding-profile of the specimen image upon inserting said preceding objective lens in the optical path, which is obtained from said calculation means; and control means for adjusting a position of said stage on the basis of the succeeding-profile obtained from said prediction means to perform focusing control.

2. An apparatus according to claim 1, wherein the profile is a frequency distribution of the specimen image, and said control means comprises means for adjusting the position of said stage by giving attention to an area having a high intensity in the frequency distribution predicted by said prediction means.

3. An apparatus according to claim 2, wherein said control means comprises means for stopping an own operation when a frequency band of the specimen image predicted by said prediction means is determined to fall outside an image input range of said image sensor.

4. An apparatus according to claim 1, wherein the profile is a shape of the specimen image, and said control means comprises means for adjusting the position of said stage by giving attention to an area having a high contrast in the shape the specimen image predicted by said prediction means.

5. An apparatus according to claim 4, further comprising drive means for driving said stage in a direction perpendicular to an optical axis of said objective lens, wherein said control means comprises means for controlling said drive means so as to move said stage to a position where the shape of the specimen image can be caught by said image sensor when the shape of the specimen image predicted by said prediction means is determined to fall outside an image input range of said image sensor.

6. An apparatus according to claim 1, wherein the optical parameter is a magnification of said objective lens.

7. An apparatus according to claim 1, wherein the optical parameter is a numerical aperture of said objective lens.

8. An apparatus according to claim 1, wherein said stage, said plurality of objective lenses, and said imaging optical system are attached to a microscope main body.

9. An autofocus control method comprising the steps of:

detecting a preceding-profile of a specimen image upon inserting a preceding objective lens in an optical path to a specimen placed on a stage;

predicting a succeeding-profile of the specimen image upon inserting a succeeding objective lens in the optical path on the basis of a preceding-optical parameter of said preceding objective lens and a succeeding-optical parameter of said succeeding objective lens, which are inserted in the optical path, and the preceding-profile; and adjusting a position of said stage with respect to the specimen on the basis of the succeeding-profile obtained in the prediction step.

10. A microscope comprising:

a frame;

a stage which is attached to said frame and on which a specimen is placed;

a revolver which is attached to said frame, and has a plurality of objective lenses with different optical parameters to be selectively inserted in an optical path to the specimen placed on said stage;

an imaging optical system attached to said frame to form an image of the specimen through, of said plurality of objective lenses of said revolver, an objective lens selectively inserted in the optical path;

an image sensor which is attached to said frame, and on which the optical image formed by said imaging optical system is projected to output an image signal of the specimen;

calculation means for calculating a frequency distribution of the image signal of the specimen output from said image sensor;

prediction means for predicting a frequency distribution of the specimen image upon inserting a succeeding objective lens in the optical path on the basis of a change in optical parameters of a preceding objective lens and said succeeding objective lens inserted in the optical path, and the frequency distribution of the specimen image upon inserting said preceding objective lens in the optical path, that is obtained from said calculation means; and control means for adjusting a position of said stage on the basis of the frequency distribution obtained from said prediction means to perform focusing control.

* * * * *